Dec. 19, 1933.                L. A. DUMSER                1,940,404
                    FEEDING MECHANISM FOR MACHINE TOOLS
                    Filed March 28, 1932     3 Sheets-Sheet 1

Inventor:
Leo A. Dumser,

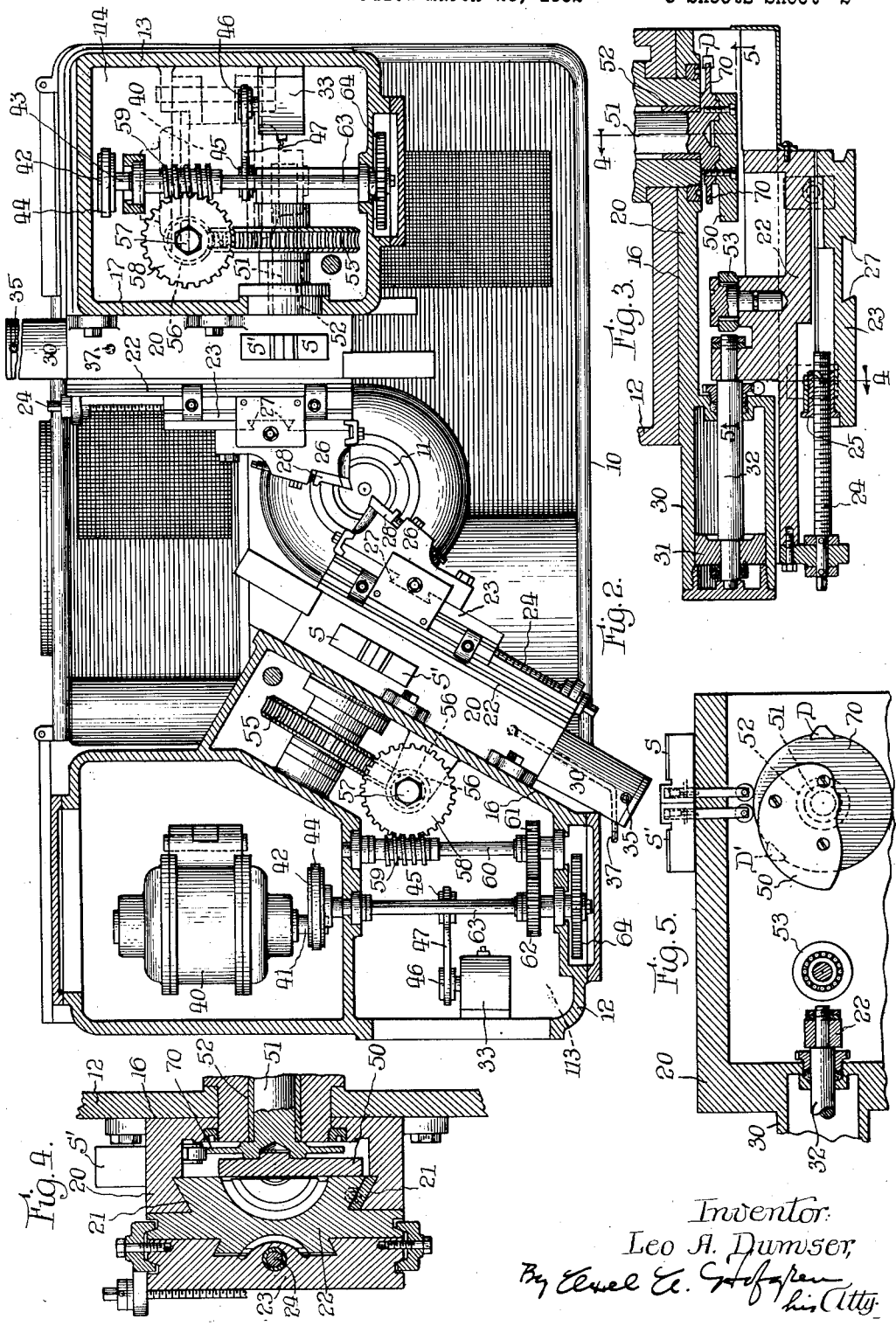

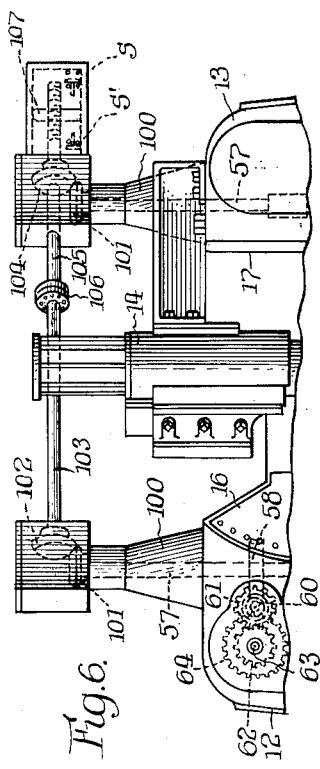

Patented Dec. 19, 1933

1,940,404

UNITED STATES PATENT OFFICE 1,940,404

FEEDING MECHANISM FOR MACHINE TOOLS

Leo A. Dumser, Rockford, Ill., assignor to Sundstrand Machine Tool Co., Rockford, Ill., a corporation of Illinois Application March 28, 1932. Serial No. 601,604

21 Claims. (Cl. 82—21)

This invention relates generally to machine tools and more particularly to a feeding mechanism for machine tool supports.

The general object of the invention is to provide a new and improved feeding mechanism for a reciprocatory support, which is simple in construction and efficient and flexible in operation.

Another object of the invention is to provide, in a machine tool embodying a rotary support and a reciprocatory support, one of which supports the work and the other the tool, a new and improved feeding mechanism for the reciprocatory support capable of varying the speed of the support during the cutting operation so as to secure maximum production on duplicate work pieces.

Another object is to provide a feeding mechanism for reciprocating a support embodying a reversible electric means together with control therefor for determining the starting, reversing and stopping of the support, fluid means operable by said motor for actuating the support at a rapid traverse rate so as to move the support rapidly without shock, and mechanical means arranged to limit the speed of the support during a portion of its stroke to a feed rate, so as to combine in the feeding mechanism the desirable features of each of said electric, hydraulic and mechanical means without including any of the undesirable features of each.

Another object is to provide such a feeding mechanism for reciprocating a support embodying a piston and cylinder device for actuating the support, a pump for supplying fluid to said cylinder, mechanical means for limiting the speed of the support during a portion of its movement to a feed rate, thereby eliminating the use of mechanical clutches and control devices and the loss of time incident to the use thereof, and a reversible electric motor for driving said pump and mechanical means.

Another object of the invention is to provide a feeding mechanism for a reciprocatory support comprising a piston and cylinder device for actuating the support, a pump having inlet and outlet ports connected to the opposite ends of the cylinder without the intervention of control valves, a reversible electric motor for actuating said pump to reciprocate the support, and means for controlling the starting, reversing and stopping of said motor to control the movements of said support.

Other objects and advantages will become readily apparent from the following detailed description taken in connection with the accompanying drawings, in which:

Fig. 2 is a horizontal section approximately along the line 2—2 of Fig. 1.

Fig. 3 is a horizontal section through a tool support approximately along the line 3—3 of Fig. 1.

Fig. 4 is a section approximately along the line 4—4 of Fig. 3.

Fig. 5 is a section approximately along the line 5—5 of Fig. 3.

Fig. 6 is a fragmentary front elevation of a modified form of the invention.

Fig. 7 is a diagrammatic representation of the hydraulic circuits for the form of the invention illustrated in Figs. 1 to 5.

Fig. 8 is a diagrammatic representation of the hydraulic and electrical circuits for a single support as illustrated in Figs. 1 to 5.

Fig. 9 is a fragmentary diagrammatic view showing the hydraulic circuit for the second support in the modified form shown in Fig. 6.

Figure 1:
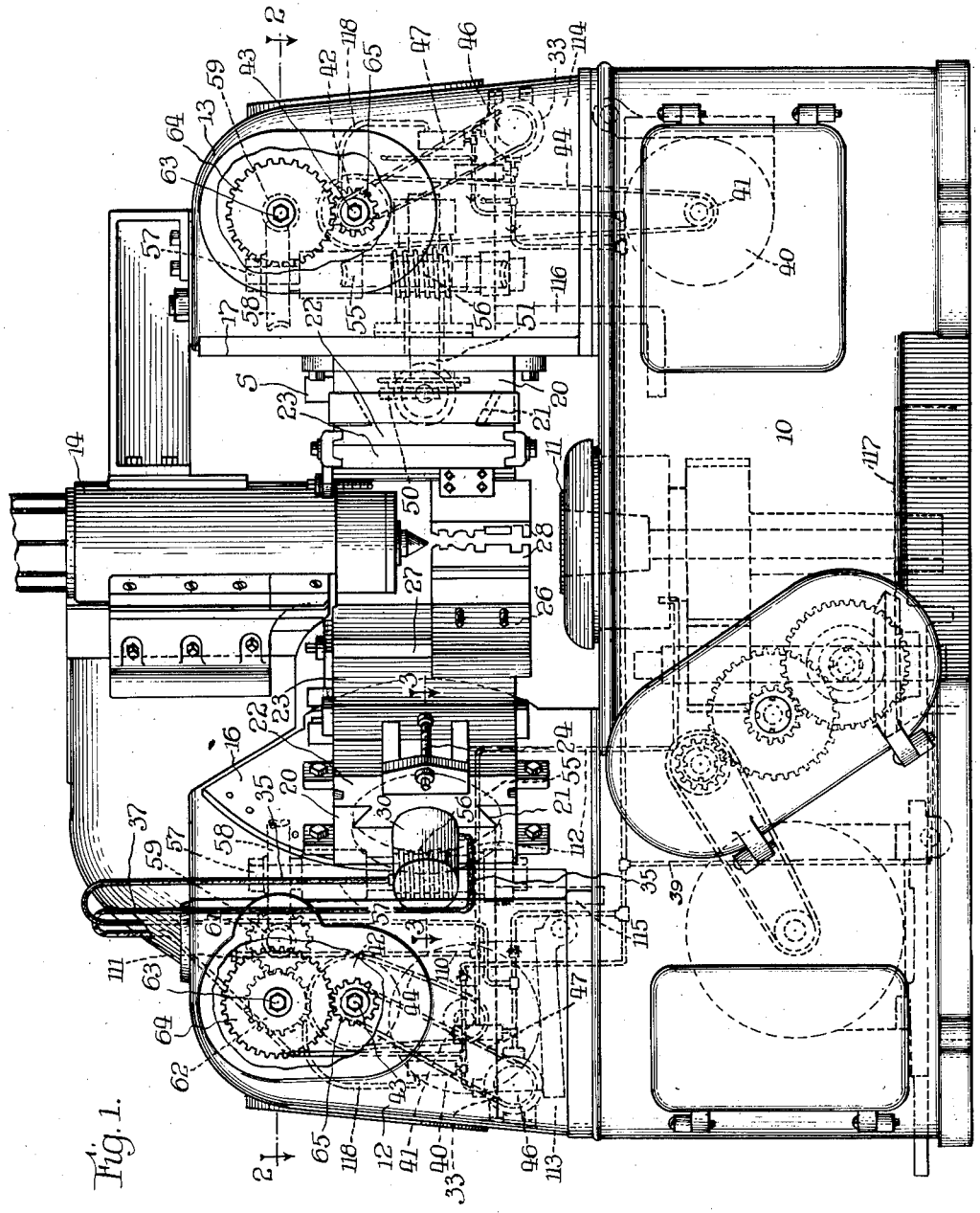
Fig. 1 is a front elevation of a lathe embodying a preferred form of the invention.

While there is illustrated in the drawings and shall herein be described in detail a preferred embodiment of the invention as incorporated in a lathe, together with a modified form thereof, it is to be understood that the present disclosure is to be considered as an exemplification of the principles of the invention and is not intended to limit the invention to the embodiment illustrated. The invention is readily adapted for use in other types of machine tools and the scope thereof will be pointed out in the appended claims.

In the form illustrated in the drawings, the invention is embodied in a lathe comprising a substantially rectangular supporting frame element or base 10 having a work supporting spindle 11 rotatably mounted on a vertical axis positioned somewhat centrally of the base, a pair of vertically extending frame elements or columns 12 and 13 which are mounted on the base 10 and project upwardly therefrom to serve as supports for tool carriers, and a tail-stock 14 adjustably mounted on the upper end of the column 12. The columns 12 and 13 are preferably positioned on opposite sides of the spindle 11, and as illustrated herein the column 12 is mounted at the left-hand end of the base and the column 13 is mounted on the rear right-hand corner of the base. The columns are provided with supporting surfaces so arranged that during the operation of the machine the tool supports are in compression against the columns and the forces thereagainst act in a direction substantially perpendicular to the surfaces on the columns. Thus the column 12 has a supporting surface 16 on the side adjacent the spindle and the column 13 has a supporting surface 17 also on the side adjacent the spindle. The left-hand column 12 is preferably provided with a beveled surface so as to provide greater accessibility to the spindle from the front of the machine.

The tool supporting structures disclosed herein, as illustrated most clearly in Figs. 1 to 4, and their actuating and controlling mechanisms as well, are in some respects duplicates and for this reason the tool supporting structure on the column 12, together with its actuating and control mechanism is illustrated in detail. The tool supporting structures comprise generally swivel bases 20 provided with longitudinally extending ways 21, slides 22 movably mounted on the ways 21, parts 23 adjustable longitudinally on the slides by means of adjusting screws 24 journaled on the slides and engaging nuts 25 on the parts 23, transversely movable members 26 mounted on ways 27 on the parts 23, and longitudinally adjustable tool holders 28 mounted on the transversely movable members 26. The bases 20 are pivotally mounted on the columns 12 and 13 so that they may be adjusted to different angles.

The actuating mechanisms for the slides 22 are herein disclosed as comprising piston and cylinder devices having cylinders 30 formed integrally with the swivel bases 20, pistons 31 positioned in said cylinders, and piston rods 32 secured at one end to the pistons and at their other ends to the slides 22. The cylinders are arranged to be supplied with pressure fluid by reversible pumps 33 (Figs. 1, 2 and 7), mounted within the columns 12 and 13, ports 34 of the pumps being connected to one end of the cylinders 31 by means of conduits 35, and other ports 36 of the pumps being connected to the other ends of the cylinders by conduits 37. Thus when the pump drive shafts 38 (Fig. 7) are rotated in one direction fluid is supplied to one end of the cylinders 30 to move the tool slides in one direction, and when the pumps are driven in a reverse direction fluid is supplied to the other ends of the cylinders to return the tool slides. Preferably the conduits 35 and 37 are provided with pressure relief valves 35' and 37', respectively, and are provided with connections 35'' and 37'' communicating with a suction conduit 39 which extends into a fluid reservoir 117 formed in the lower portion of the base 10. The connections embody check valves 35ᵃ and 37ᵇ which are operable to permit fluid to be drawn into the conduits and to prevent fluid from passing back into the reservoir. With the invention embodied in a lathe, as illustrated herein, the pressure relief valve 35' may be set for a relatively high pressure so that the pistons 31 will maintain the cam followers against the cams 50 (Fig. 3) during cutting operations. The pressure relief valves 37' may be set at a relatively low pressure sufficient to permit the proper return of the tool slides at a rapid traverse rate.

The pumps 33 may be of any preferred form such, for example, as an intermeshing gear type, and are arranged to be driven by reversible electric motors 40 one of which is mounted within the column 12 and the other below the column 13. These motors, as illustrated most clearly in Figs. 1, 2 and 7, have pulleys 41 which are connected to pulleys 42 on horizontal shafts 43 by means of belts 44. Pulleys 45 on the shafts 43 are connected to pulleys 46 on the pump shafts 38 by means of a belt 47. With this arrangement the tool slides may be reciprocated by alternatively running the motors 40 in forward and reverse directions. By so doing it is possible to eliminate control valves in the connections between the pumps 33 and the cylinders 30, the starting, reversing and stopping of the tool slides being effected by starting, reversing and stopping the motors 40.

The pumps 33 are preferably of such capacity that when driven by the motors 40 the tool slides will be moved at a rapid traverse rate, the invention preferably including means for automatically reducing the speed of the tool slides to a feed rate during a portion of the advance movement thereof. As illustrated herein, this means includes cams 50 (Figs. 3, 4 and 5) positioned in recessed portions of each swivel base 20 and mounted on the forward ends of shafts 51 which extend through alined openings in the bases 20 and the adjacent walls of the columns 12 and 13, and are rotatably mounted therein by means of suitable bearings 52. These cams are arranged to be engaged by rollers 53 (Figs. 3, 4 and 5) mounted on the slides 22, so that when fluid is admitted to the outer ends of the cylinders 30 (left-hand end of Fig. 3) the tool slides 22 will be moved at a rapid traverse rate toward the spindle axis until the rollers 53 engage the cams 50, whereupon the speed of the tool slides will be reduced to a feed rate as determined by the contour of the cams 50 and the speed of rotation thereof. When the end of the cut has been reached and the motors 40 are reversed, fluid will be forced into the opposite, or inner, ends of the cylinders 30, with the result that the tool slides will be returned the entire distance at a rapid traverse rate. The cams 50 may in some instances be provided with uniformly receding contours, but for certain classes of work, where it is desired to obtain a maximum production of duplicate pieces, the cams are preferably provided with a variable contour designed to vary the rate of feed during the cutting operation and maintain a maximum removal of metal. Particularly when the machine is used for finishing a large number of duplicate pieces the proper contour of the cams may be determined by actual tests so as to maintain the load on the spindle motor substantially constant.

The cams 50 are preferably arranged to be driven from the motors 40 so that when the motors are reversed to pump fluid into the return slides of the cylinders 30 they also act to return the cams 50 to their initial positions. As illustrated in Figs. 2 and 3, the cam shafts 51 carry the cams 50 and have worm wheels 55 secured thereto which mesh with worms 56 secured to vertically extending shafts 57. The shafts 57 in turn carry worm wheels 58 which mesh with worms 59 secured to horizontally extending shafts 60. Gears 61 on the shafts 60 mesh with gears 62 on parallel shafts 63. These shafts are also provided with pick-off gears 64 on their forward ends which mesh with corresponding pick-off gears 65 detachably secured to the forward ends of the shafts 43.

It will be readily apparent from the foregoing that in order to control the forward and return movements of the tool slides it is only necessary to control the forward and reverse rotation of the motors 40. When the mechanism is used on a machine wherein considerable time is required for the removal of a finished work piece and the insertion of a new piece, single speed motors may be used, the feed motors continuing in operation after the work spindle has stopped and after the tool slides have been returned for the purpose of returning the cams 50 to their initial positions. However, and preferably when it is desired to cut down the lapse in time between the finish of the cutting operations on one work piece and the commencement of the cutting portion of the succeeding work cycle, the motors 40 may be of a two-speed type. They are then operated at a slow speed in the forward direction and at a higher speed in the reverse direction so as to return the cams 50 more quickly.

In Fig. 8 there is illustrated diagrammatically the electrical connections for such a two-speed motor for one tool slide (in full lines), arranged to be controlled either manually by means of push buttons on a push button station PB, or automatically by means of control dogs D and D' which are secured to a dog wheel 70 (Figs. 3 to 5) on the cam shaft 51, and are arranged to actuate control switches S and S'. Referring to Fig. 8, the feed motor 40 is of the three-phase alternating current type and is provided with three low speed terminals T1, T2 and T3, and three high speed terminals H1, H2 and H3. The low speed terminals are arranged to be connected to line wires L1, L2 and L3 through contacts T1', T2' and T3', and the high speed terminals are arranged to be connected to the line wires through contacts H3', H2' and H1'. The high speed connections are reversed so that the motor will run at its low speed in a forward direction and at its high speed in the reverse direction.

The low speed contacts T1', T2' and T3' are arranged to be closed by means including a coil T and the high speed contacts H3', H2' and H1' are arranged to be closed by means of a coil H. These coils are herein arranged to be energized either by manual operation of push buttons or by automatic operation of the switches S and S'. The push button station PB is preferably provided with a forward button F which comprises a pair of normally open contacts 71, a reverse button R which has a pair of contacts 72 normally closed, and a second pair of contacts 73 normally open, and a stop button ST which has a pair of contacts 74 normally closed.

One of the stop contacts 74 is connected to the line L1 by means of a conductor 75 and the other of said contacts is connected to one end of the coil T by means of a conductor 76. One end of the coil H is connected to the conductor 76 by means of conductors 77 and 78 in series with the contacts 79 of the stop switch S1. The other end of the coil T is connected to one of the contacts 71 of the forward push button station by means of a conductor 80, the other of said contacts being connected with one of a pair of normally closed contacts 81 of the reversing switch S by means of a conductor 82. The normally closed contacts of the reversing switch S are connected in series with the normally closed contact 72 of the reverse push button R by means of a conductor 83, one of the contacts 72 being connected to the line L3 by means of a conductor 84. The normally open contacts 73 of the reverse push button R and a pair of normally open contacts 85 of the reversing switch S are connected in parallel by means of conductors 86 and 87. The contacts connected by conductor 87 are also connected to line L3 by means of a conductor 88. The contacts connected by conductor 87 are connected to the other end of the coil H by means of a conductor 89. Preferably a pair of holding contacts 90 are shunted across the contacts 71 of the forward push button F, these contacts being arranged to be closed simultaneously with the closing of the contacts T1', T2' and T3' by the energization of the coil T so as to hold said motor contacts closed after the push button F is released. Similarly a pair of holding contacts 91 are shunted across the contacts 73 of the reverse push button R and are arranged to be closed simultaneously with the motor contacts H3', H2' and H1' so as to hold the said motor contacts closed after the push button R on the reversing switch S has been actuated and then released.

When it is desired to start a tool support cycle the forward push button F is depressed to shunt the contacts 71, thus energizing the coil T and closing contacts T1', T2', and T3'. At the end of the forward stroke of the tool slide the dog D actuates the reversing switch S to open the contacts 81 and close the contacts 85, whereupon the coil T is deenergized to permit the contacts T1', T2' and T3' to open, and the coil H is energized to close the contacts H3', H2' and H1' to reverse the motor and run it at its high rate of speed in its opposite direction. When the cam 50 reaches its initial position the dog D1 actuates the switch S1 so as to open the contact 79, thereby deenergizing the coil H and stopping the feed motor. It will be readily apparent that since the reversing push button R has its normally closed contacts connected in series with those of the reversing switch S, and has its normally open contacts connected in parallel with those of the reversing switch S, manual actuation of the push button R would duplicate the automatic actuation of the reversing switch S. The contacts 74 of the stop switch ST are preferably connected in series with both coils T and H so that manual operation of this push button serves to stop the tool slide irrespective of the direction of rotation of the motor at that time. In the form of the invention illustrated in Figs. 1 to 5 and 7, wherein a separate motor and pump are provided for each tool support, a control mechanism such as illustrated in Fig. 8 and just described is provided for each motor 40.

In the form of the invention illustrated in Fig. 6, both tool supports are actuated by a single feed motor 40 and pump 33 and controlled by a single automatic control mechanism. In this form the shafts 57 are preferably extended upwardly through housings 100 and carry bevel gears 101 on their upper ends, which are connected together by means of a corresponding bevel gear 102 carried on a horizontal shaft 103 and a bevel gear 104 carried on a second shaft 105 which is alined with and coupled to the shaft 103 by means of an adjustable coupling 106. The pick-off gearing and shafts 60 and 63 as well as the motor 40 and pump 33 in the column 13 are thus eliminated, and automatic control switches S and S' are preferably mounted adjacent the shaft 105 and arranged to be actuated by means actuated by said shaft. In Fig. 6 such a means is illustrated somewhat diagrammatically as comprising a member 107 screw threaded on said shaft. The adjustable coupling 106 permits of adjusting the relative positions of the cams 50 of the two tool supports, whereas the actuation of the automatic control mechanism by a member actuated by the shaft 105 makes possible the reversing and stopping of the tool supports.

In Fig. 9 there is illustrated the connections for the right-hand cylinder 30 for the form of the invention illustrated in Fig. 6. With both tool supports actuated by fluid from a single pump the cylinders 30 are connected in parallel, a conduit 120 being provided for connecting the outer end of the right-hand cylinder 30 to the conduit 35 (Fig. 8), and a conduit 121 being provided for connecting the inner end of the right-hand cylinder 30 with the conduit 37 (Fig. 8). Thus a single pump, motor and control suffice to actuate both tool supports simultaneously.

Preferably provision is made for lubricating the mechanical parts automatically during the operation of the machine and in the forms illustrated herein, wherein oil is discharged through the pressure relief valves, conduits are provided carrying this oil to advantageous points for discharge onto the mechanisms. As illustrated in Fig. 1, conduits 110 are connected at one end to the pressure relief valves 35' and extend upwardly in the columns. At their upper ends they carry spray nozzles 111 arranged to discharge the oil over the gearing. A branch 112 from one conduit 110 is arranged to conduct oil and discharge it against the spindle bearings. Reservoirs 113 and 114 are formed in the lower portions of the columns 12 and 13, overflow conduits 115 and 116 being provided to conduct excess oil from said reservoirs to the reservoir 117 formed in the lower portion of the base 10. Conduits 118 are connected to the pressure relief valves 37' and are arranged to discharge oil onto the speed change gearing in the columns. In this manner the gearing of the machine is adequately lubricated, the mechanisms in the two columns and the spindle bearings being lubricated by the discharge through the pressure relief valves.

The ability to vary the rate of feed during a cutting operation by providing cams having special contours makes possible an extremely high rate of production of duplicate work pieces. Under such circumstances, assuming that the spindle is actuated by a motor of sufficient power, the ability of the tools to cut and the ability of the work piece itself to withstand the cutting would be the final factors in determining the production rate. With a machine as constructed herein, ample power may be connected to the spindle and the tools are provided with extremely efficient and effective mountings so as to withstand a maximum load thereon. In such instances therefore it is possible to design the cams so as to vary the feed rate and maintain substantially constant the torque applied to the work piece.

In the form illustrated herein the reciprocation of the tool supports is accomplished by reversing the feed motors, the extent of forward movement of the tool support being determined by the cams 50 and the withdrawn position of the tool supports being determined by the engagement of the piston rods 32 with the rear ends of the cylinders 30. However, it will be readily apparent that if it is desired to shorten the stroke, adjustable interengaging abutments may be placed on adjacent portions of the swivel bases 20 and the slides 22. Such abutments may be provided for each end of the stroke, thereby providing a readily visible means to assist the operator in setting up the machine, and enabling the several tool supports to be stopped independently of dwell portions on the cams 50 at the end of the feed movements.

By including in the feeding mechanism a reversible electric means and control for determining the starting, reversing and stopping of the supports, together with fluid means for actuating the supports at a rapid traverse rate, and mechanical means for limiting the speed of the support during the feed portion of the stroke, the feeding mechanism embodies the desirable features of each of the electric, hydraulic and mechanical means, and at the same time eliminates the undesirable features of each. For example, since the starting, reversing and stopping of the support is obtained by starting, reversing and stopping the motor, valves are eliminated from the hydraulic circuit, and furthermore by starting, reversing and stopping of the mechanical means by starting, reversing and stopping the electric motor, mechanical clutches are eliminated. Thus the various mechanisms are combined so that their advantageous features may be utilized to the fullest extent.

By providing the hydraulic circuit with adjustable pressure relief valves, it is possible to establish the maximum tool pressures during the cutting operation, thereby preventing excessive pressure coming upon the edges of the cutting tools. By such an arrangement it is possible to adjust the valves so that the feed mechanism will not continue to operate when the tools have reached a certain degree of dullness.

I claim as my invention:

1. A machine tool having, in combination, a reciprocatory support, a reversible electric motor for advancing and retracting said support, hydraulic means forming a driving connection between said motor and support, and means for controlling the starting, reversing and stopping of said motor to effect the starting, reversing and stopping of said support including means movable in accordance with the support during its advance for automatically effecting the reversal of the support.

2. A machine tool having, in combination, a reciprocatory support, a piston and cylinder device for actuating said support, a pump, conduits connecting said pump to said cylinder, a reversible electric motor connected to said pump and operable when rotating in one direction to actuate the pump to advance said support and when rotating in the opposite direction to return the support, manually operable means for starting said motor to advance the support, and means for reversing and stopping the motor comprising means driven by said motor operable automatically at the end of the advance movement of the support to reverse said motor and, after the support has returned to its initial position, to stop the motor.

3. A machine tool having, in combination, a reciprocatory support, a reversible electric motor for actuating said support, hydraulic means forming a driving connection between said motor and support, and means for controlling the starting, reversing and stopping of said motor to effect the starting, reversing and stopping of said support, said motor and hydraulic means being effective to reciprocate said support at a traverse rate and including means effective to limit the movement of the support to a feed rate during a portion only of its advance movement.

4. A machine tool having, in combination, a reciprocatory member, means for actuating said member comprising a piston and cylinder device, a reversible pump having inlet and outlet ports, means connecting said ports to the opposite ends of said cylinder, a reversible electric motor connected to drive the pump in forward and reverse directions to provide fluid under pressure to reciprocate said member at a traverse rate, and means driven by said motor effective to limit the speed of movement of the member in a forward direction to a feed rate.

5. A machine tool having, in combination, a reciprocatory support, means for reciprocating said support comprising a hydraulic motor, a pump, conduit means connecting said pump to said hydraulic motor, means for driving the pump in a forward direction at a low speed during a feeding movement of said support and for driving said pump in the reverse direction at a higher speed during a return movement of said support, and means automatically actuated during the movement of said support for timing the reversing and stopping of said support.

6. A machine tool having, in combination, a reciprocatory support, a reversible electric motor for actuating said support, hydraulic means forming a driving connection between said motor and support, and means for controlling the operation of said motor and support comprising a normally open switch arranged when closed to start said motor to advance said support, means operable at the completion of the advance movement of the support to reverse said motor and return the support, and means operable upon completion of the return movement of the support to stop said motor.

7. A machine tool having, in combination, a reciprocatory support, a reversible electric motor for actuating said support, hydraulic means forming a driving connection between said motor and support, and means for controlling the operation of said motor comprising a normally open switch arranged when closed to start said motor to advance said support, means operable at the completion of the advance movement of the support to reverse said motor, and means operable upon completion of the return movement of the support to stop said motor, said hydraulic means being normally effective to reciprocate said support at a traverse rate and including means effective to limit the movement of the support to a feed rate during a portion of its advance movement.

8. A machine tool having, in combination, a reciprocatory support, and means for reciprocating said support comprising a piston and cylinder device one element of which is connected to the support, a reversible pump, a reversible electric motor connected to drive said pump in forward and reverse directions, a pair of conduits connecting said pump with the opposite ends of said cylinder, a pressure relief valve in one of said conduits operable at a relatively low pressure, a pressure relief valve in the other of said conduits operative at a relatively high pressure, a fluid reservoir into which said pressure relief valves discharge excess fluid, and intake pipes connecting said conduits with said reservoir and having check valves therein for preventing flow of fluid to the reservoir.

9. A machine tool having, in combination, a reciprocatory support, and means for reciprocating said support comprising a piston and cylinder device, a reversible pump, a reversible electric motor connected to drive said pump in forward and reverse directions, a pair of conduits connecting said pump with the opposite ends of said cylinder, pressure relief valves in said conduits, a fluid reservoir into which said pressure relief valves discharge excess fluid, and intake pipes connecting said conduits with said reservoir and having check valves therein for preventing flow of fluid to the reservoir.

10. A machine tool having, in combination, a support, a member movably mounted on said support, a piston and cylinder device one element of which is secured to said member and the other to said support, a reversible pump, conduit connections between said pump and the opposite ends of said cylinder, a reversible electric motor for driving said pump operable in one direction to advance said member at a traverse rate and in the other direction to return said member at a traverse rate, and mechanically driven means for restraining the speed of said member to a feed rate during a portion of the advance stroke thereof comprising a cam movably mounted on said support, a follower for said cam secured to said member, and means for driving said cam in forward and reverse directions.

11. A machine tool having, in combination, a support, a slidable member movably mounted on said support, a piston and cylinder device one element of which is secured to said support, and the other to said slidable member, a pump having two ports, a pair of conduits connecting said ports to the opposite ends of said cylinder, an electric motor connected to said pump and operable to rotate the pump in one direction to advance said slide at a traverse rate and reversible to rotate said pump in the opposite direction to return said slide, and means for limiting the speed of movement of the slide during a portion of its advance stroke comprising a cam device movably mounted on said support, mechanical means connecting said cam device and motor to drive the cam device by the motor, and a follower for said cam device carried by the slide.

12. A lathe having, in combination, a pair of tool supports, means for actuating said supports comprising piston and cylinder devices, a pair of reversible pumps connected one to each of the cylinders, a pair of reversible electric motors connected one to drive each of said pumps in forward and reverse directions, means for controlling the operation of said motors to effect reciprocation of said tool supports at a traverse rate, and means driven by said motors for limiting the speed of said supports to a feed rate during a portion of the advancing movements thereof.

13. A machine tool having, in combination, a support, a member slidably mounted on said support, means for reciprocating said member comprising a hydraulic motor, pumping mechanism, means connecting said pumping mechanism to said hydraulic motor, a two-speed reversible electric motor for driving the pumping mechanism operable in a forward direction at a low speed during a feeding movement of said member and in a reverse direction at a higher speed during a return movement of said member, and means automatically actuated during the movement of said member for timing the reversing and stopping of the member.

14. A machine tool having, in combination, a reciprocatory member, means for actuating said member comprising a piston and cylinder device one element of which is connected to said member and the other to said support, a reversible pump having inlet and outlet ports, means connecting said ports to the opposite ends of said cylinder, a two-speed reversible electric motor connected to drive the pump in forward and reverse directions to provide fluid under pressure to reciprocate said member, means for controlling the operation of said motor to operate the motor at its low speed in a forward direction during the feed movement of the member, and to operate the motor at its high speed in the reverse direction during a rapid return movement of said member.

15. A machine tool having, in combination, a reciprocatory member, means for actuating said member at feed and traverse rates comprising a hydraulic motor, a pump, means connecting said pump to said hydraulic motor, and means for driving the pump in a forward direction at a low speed during a feeding movement of said member and for driving said pump in the reverse direction at a higher speed during a return traverse movement of said member.

16. A machine tool having, in combination, a support, a slidable member movably mounted on said support, a piston and cylinder device one element of which is secured to said support, and the other to said slidable member, a pump having inlet and outlet ports, a pair of conduits connecting said ports to the opposite ends of said cylinder, a two-speed electric motor connected to said pump and operable in one direction at the lower speed to rotate the pump in one direction to advance said slide at a traverse rate, and operable at the higher speed in the reverse direction to rotate said pump in the opposite direction to return said slide, and means for limiting the speed of movement of the slide during a portion of its advance stroke comprising a cam device movably mounted on said support, mechanical means connecting said cam device and motor to drive the cam device by the motor, and a follower for said cam device carried by the slide.

17. A lathe having, in combination, a pair of tool supports, piston and cylinder devices for actuating said supports at feed and traverse rates, a pump, conduits connecting said pump to both of said cylinders, a reversible electric motor connected to said pump and operable when rotating in one direction to actuate said pump and advance said tool supports, and when rotating in the opposite direction to retract the tool supports.

18. A machine tool having, in combination, a reciprocatory support, a reversible electric motor for reciprocating said support, hydraulic means forming a driving connection between said motor and support, and means for automatically varying the speed of the support during the cutting operation.

19. A machine tool having, in combination, a reciprocatory support, means for actuating said support comprising a piston and cylinder device, a reversible pump having inlet and outlet ports, means connecting said ports to the opposite ends of said cylinder, a reversible electric motor connected to drive the pump in forward and reverse directions to provide fluid under pressure to reciprocate said support at a traverse rate, and means driven by said motor effective to limit the speed of movement of the support during the latter portion of its movement in one direction to a feed rate including means operable to vary said feed rate during said latter portion of its movement.

20. A lathe having, in combination, a pair of tool supports, piston and cylinder devices for actuating said supports, a pump, conduits connecting said pump to both of said cylinders, pressure relief valves for said conduits, means for supplying fluid to said conduits, a reversible electric motor connected to said pump and operable when rotating in one direction to advance said tool supports and when rotating in the opposite direction to retract the tool supports, and means for controlling the reversal of said electric motor at the end of the advance movement of the tool supports for automatically reversing said motor and retracting the supports.

21. A lathe having, in combination, a frame, a pair of tool supports movably mounted on said frame, a pair of piston and cylinder devices for actuating said tool supports, a reversible pump, conduit connections between said pump and both of said cylinders so that when the pump is rotated in one direction the tool supports will be advanced and when rotated in the opposite direction the tool supports will be returned at a traverse rate, and means for restraining the movement of the tool supports to a feed rate during a portion of the advance stroke comprising a movably mounted cam device for each tool support, followers for said cam devices secured to said supports, and means for moving said cams comprising a reversible electric motor and a gearing connection between said motor and said cam devices including alterable change gears.

LEO A. DUMSER.